May 26, 1931. W. J. BORER 1,806,584
LAWN MOWING MACHINE
Filed Jan. 29, 1926   2 Sheets-Sheet 1
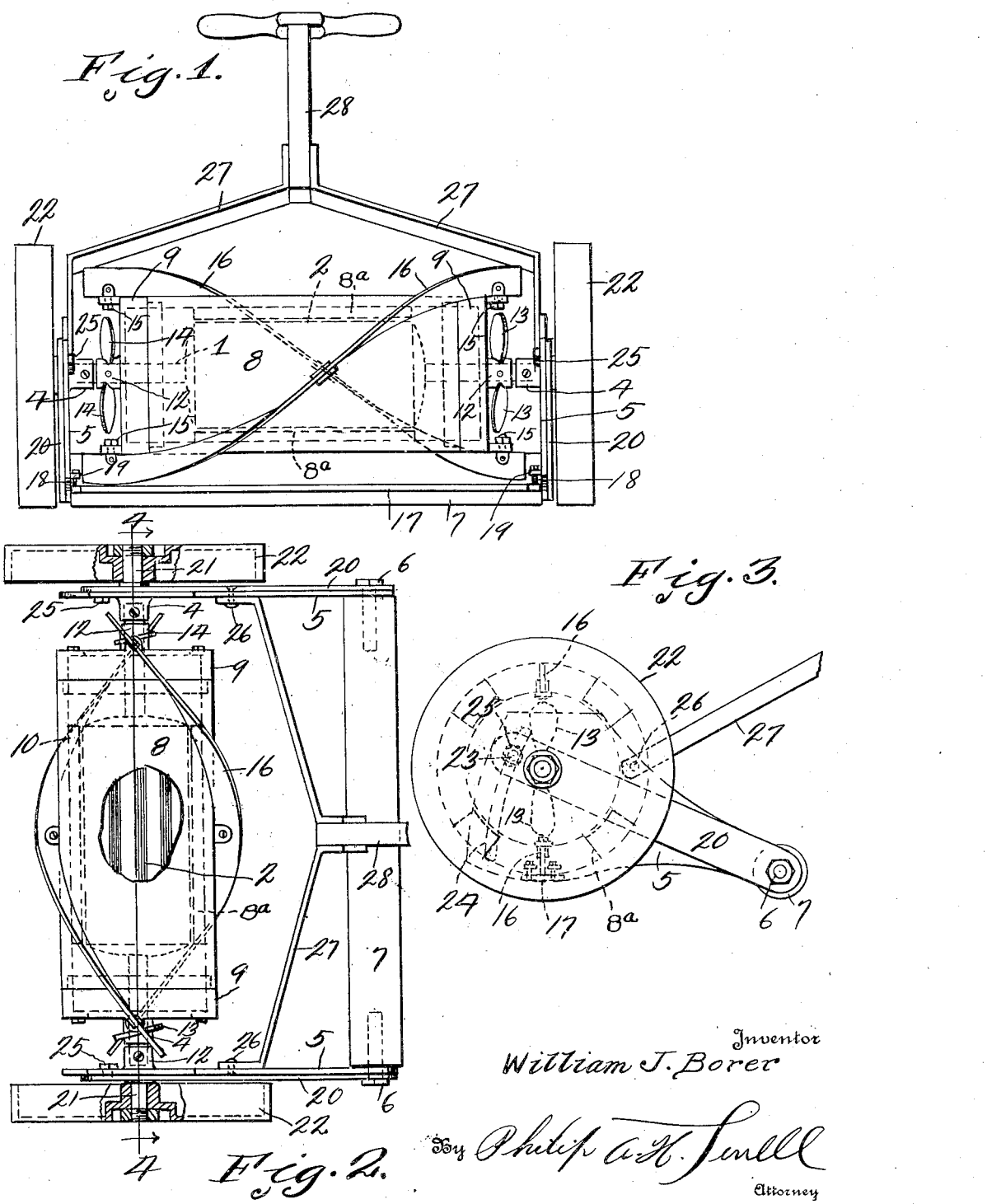
Inventor
William J. Borer
By Philip A. H. Snell
Attorney May 26, 1931.　　W. J. BORER　　1,806,584
LAWN MOWING MACHINE
Filed Jan. 29, 1926　　2 Sheets-Sheet 2

Inventor
William J. Borer

Patented May 26, 1931

1,806,584

UNITED STATES PATENT OFFICE

WILLIAM JOHN BORER, OF GENOA, NEBRASKA

LAWN MOWING MACHINE

Application filed January 29, 1926. Serial No. 84,637.

The invention relates to lawn mowing machines and has for its object to provide a device of this character which is motor driven as far as the cutting blades are concerned and driven by an electric motor wherein the armature is stationary as the lawn mower moves over the ground, and the outer casing or field of the electric motor rotates, and which field is preferably cylindrically shaped and provided with cutting knives which cooperate with a cutter bar adjacent the lower side of the machine for severing grass as the machine advances.

A further object is to provide the field casing which rotates with spiders in the ends thereof and fans rotatable with the field casing, which will direct a blast of air through the field casing for maintaining the electric motor cooled at all times and preventing overheating. Also to provide a fan at the opposite end of the field casing, which will suck air from the casing, thereby additionally insuring a circulation of air through the field casing at all times.

A further object is to provide a stationary hollow armature shaft, the ends of which are mounted in bosses of plates at opposite sides of lawn mower, and to rotatably mount the field cylinder on said shaft, and to provide link bars pivoted to the outer sides of the plates and adjustably connected to the plates, and provided with spindles for the reception of supporting wheels, said links forming means in connection with the adjustable connection thereof with the plates whereby the cutter bar may be varied in elevation in relation to the ground. The adjustable connection is obtained by means of bolts carried by the links adjacent their free ends and extending through arcuate slots in the plates.

A further object is to provide the plates with inwardly extending lugs, in which adjusting bolts are rotatably mounted and which adjusting bolts are threaded into the ends of the cutter bar, and forming means whereby said cutter bar may be easily and quickly adjusted in relation to the knives.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a front elevation of the lawn mower.

Figure 2 is a top plan view of the lawn mower.

Figure 3 is a side elevation.

Figure 4:
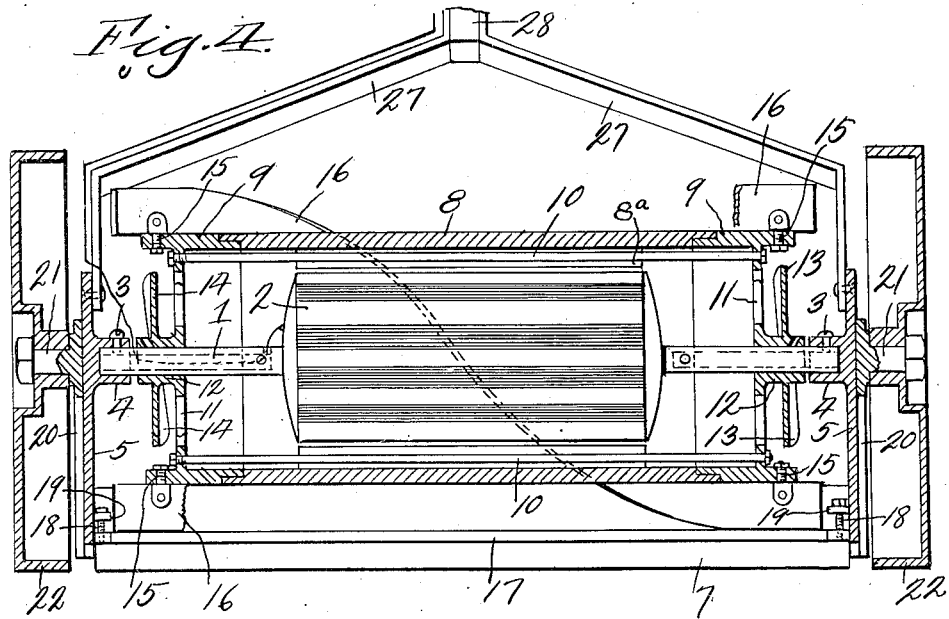
Figure 4 is a vertical transverse sectional view through the lawn mower taken on line 4—4 of Figure 2.
Figure 5:
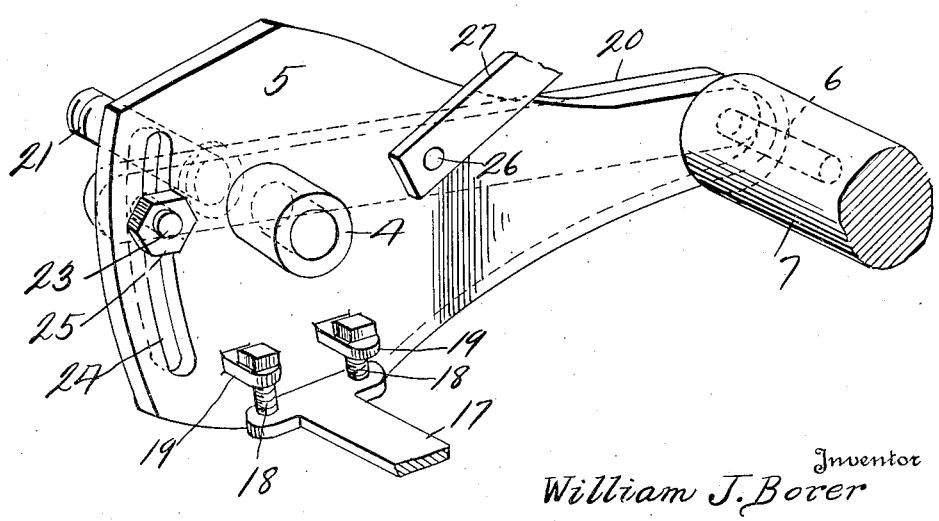
Figure 5 is a perspective view of one of the side plates and adjacent mechanism.

Referring to the drawings, the numeral 1 designates a hollow shaft, through which wires may be passed if desired and 2 the armature of the electric motor. The ends of the hollow shaft 1 are secured by means of set screws 3 in bosses 4 carried by the side plates 5, which side plates are in parallel relation and in vertical plane. The rear ends of the plates 5 are pivotally mounted on a bolt 6 at opposite sides of the machine, which bolt extends into a conventional form of roller 7. Rotatably mounted on the stationary shaft 1 is a field casing 8, which casing is provided with field coils 8a and removable end pieces 9, which are held in engagement with the ends of the casing by means of bolts 10 extending through the field casing and the head as clearly shown in Figure 4. The heads 9 are provided with spiders 11 which allow access of air longitudinally through the electric motor as a whole and which spiders support sleeves 12 which are rotatably mounted on the hollow shaft, therefore it will be seen during the operation of the motor the field casing 8 may freely rotate. Mounted on the sleeves 12 are fan blades 13 and 14. The fan blades 13 direct a blast of air through the casing 8, and the fan blades 14 act as suction blades and suck air from the casing 8, therefore it will be seen that the electric motor will be cooled and prevented from overheating incident to constant use. Secured to the outer periphery of the casing 8 by means of bolts 15 are cutter blades 16, which cutter blades extend in a spiral direction around the casing and as the casing 8 rotates said cutter blades 16 cooperate with a cutter bar 17 beneath the casing for shearing the blades of grass or other material that is cut. The ends of the cutter bar 17 have threaded therethrough spaced bolts 18, which spaced bolts are rotatably mounted in lugs 19 carried by the inner faces of the side plates 5, and by adjusting said bolts 18, it will be seen that the cutter bar 17 may be adjusted towards and away from the lower side of the field casing 8 for adjusting the cutter bar in relation to the cutting edges of the blades 16.

Pivotally mounted on the bolts 6 and to the outer sides of the plates 5 are forwardly and upwardly extending bars 20, which bars adjacent their forward ends are provided with outwardly extending pintles 21 on which are rotatably mounted the ground engaging wheels 22 of the lawn mower. The forward ends of the bars 20 are provided with inwardly extending bolts 23, which bolts extend through slots 24, which are arcuate in relation to the bolts 6, and which bolts 23 have threaded thereon nuts 25, which nuts, after an adjustment of the bars 20, may be tightened for holding the bar in any adjusted position. By providing the bolts 23 and arcuate slots 24, it is obvious that the wheels and bars 20 may be adjusted for holding the cutter bar 17 at various elevations in relation to the ground and for regulating the extent to which it is desired to cut, that is, short or long, and said adjustment can be quickly made without disturbing the cutter bar adjustment.

Pivotally connected at 26 to the inner sides of the plates 5 are rearwardly and inwardly extending arms 27, which are connected to a conventional form of handle 28. During the operation of the device the movement of the lawn mower over the ground is manually accomplished, however the cutting operation is accomplished by the electric motor having the stationary armature 2 and the movable field casing 8 which carries the blades 16.

From the above it will be seen that a lawn mower is provided, the blades or reel of which are operated by an electrically driven motor and means is provided in connection with the field casing 8 for directing a blast of air through the motor casing thereby cooling the same, and by means of the pivoted bars 20 and the adjusting means 23 extending through the arcuate slots 24 in the plates 5, the cutter bar may be varied in elevation in relation to the ground for varying the cut of the grass. It will also be seen that the parts are reduced to a minimum and all gearing or belt drives are eliminated, thereby insuring a positive operation, and the motor is protected against damage.

The invention having been set forth what is claimed as new and useful is:—

1. A lawn mower comprising a non-rotatable shaft, an electric armature carried by said shaft, a field casing rotatably mounted on said shaft, blades carried by said field casing, vertically disposed plates at opposite ends of the field casing and having arcuate slots therein, rearwardly extending members carried by said plates, a roller connecting said rearwardly extending members together, said stationary shaft being connected to said plates, bars pivoted to the rearwardly extending members adjacent the rollers, bolts carried by said bars and extending through the arcuate slots in the plates and forming means whereby said bars may be adjusted in relation to the ground, wheels rotatably mounted on said bars and a cutter bar adjustably mounted on the plates and disposed below the armature field casing.

2. A lawn mower comprising a frame, ground engaging wheels carried by the frame, a stationary shaft, an electric armature carried by said shaft, an electric field casing surrounding the armature and cutter blades carried by said field casing.

3. The combination with a lawn mower having a cutter reel, of an electric motor for rotating said reel, said motor comprising a rotatable field casing on which the cutter reel is mounted and a stationary armature within the field casing.

4. In a power lawn mower, a nonrotating shaft, an electric motor on the shaft and having a rotating shell, knives mounted around the periphery of the shell, and a cutter bar held in cooperative relation with the knives.

In testimony whereof I hereunto affix my signature.

WILLIAM JOHN BORER.